United States Patent
Kashihara et al.

(10) Patent No.: US 6,563,986 B2
(45) Date of Patent: May 13, 2003

(54) ARRAYED WAVEGUIDE GRATING

(75) Inventors: Kazuhisa Kashihara, Tokyo (JP);
Kazutaka Nara, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 252 days.

(21) Appl. No.: 09/817,067

(22) Filed: Mar. 27, 2001

(65) Prior Publication Data

US 2002/0009263 A1 Jan. 24, 2002

(30) Foreign Application Priority Data

Mar. 28, 2000 (JP) .................................. 2000-087951

(51) Int. Cl.$^7$ .............................. G02B 6/34; H04B 14/00
(52) U.S. Cl. .............................. 385/37; 385/14; 385/31; 385/129; 385/130; 359/115; 359/124; 359/130
(58) Field of Search .............................. 385/14, 31, 37, 385/129, 130, 131; 359/115, 124, 130

(56) References Cited

U.S. PATENT DOCUMENTS

| | | | | |
|---|---|---|---|---|
| 5,414,548 A | * | 5/1995 | Tachikawa et al. | 359/130 |
| 5,841,919 A | * | 11/1998 | Akiba et al. | 385/37 |
| 6,188,818 B1 | * | 2/2001 | Han et al. | 385/24 |
| 6,393,170 B1 | * | 5/2002 | Nakajima et al. | 385/14 |
| 6,424,760 B1 | * | 7/2002 | Katayama et al. | 385/24 |
| 6,442,311 B1 | * | 8/2002 | Barbarossa et al. | 385/37 |
| 6,456,763 B2 | * | 9/2002 | Kashihara et al. | 385/37 |
| 6,498,878 B1 | * | 12/2002 | Ueda | 385/37 |
| 6,501,882 B2 | * | 12/2002 | Kashihara et al. | 385/37 |

FOREIGN PATENT DOCUMENTS

| | | | | |
|---|---|---|---|---|
| JP | 61-39645 | 9/1986 | ............. | 385/129 X |
| JP | 63-182227 | 7/1988 | ............. | 385/147 X |
| JP | 63-239134 | 10/1988 | ............. | 385/147 X |

* cited by examiner

*Primary Examiner*—Brian Healy
(74) *Attorney, Agent, or Firm*—Oblon, Spivak, McClelland, Maier & Neustadt, P.C.

(57) ABSTRACT

The present invention provides an arrayed waveguide grating in which the center wavelength of light transmission does not depend on the environmental temperature thereof, wherein a waveguide-formed area (10) is formed on a substrate (1), in which an optical input waveguides (2), a first slab waveguide (3), an arrayed waveguide (4) including a plurality of channel waveguides (4a) arranged side by side, each having a different length by a predetermined figure, a second slab waveguide (5), and a plurality of optical output waveguides (6) arranged side by side in that order, and the focal length of the first and seconds lab waveguides (3 and 5) are made different from each other. A continuous separation plane (80) is formed, which intersects with both the light channel of the first slab waveguide (3) and the light channel of the second slab waveguide (5), and by the separation plane (80), the above-described waveguide-formed area (10) is divided into the first waveguide-formed area (10c) including the optical input waveguides (2) and the optical output waveguides (6) and the second waveguide-formed area (10d) including the arrayed waveguide (4). For example, the second waveguide-formed area (10d) is caused to slide and move along the separation plane (80) by the slide movement member (17).

16 Claims, 6 Drawing Sheets

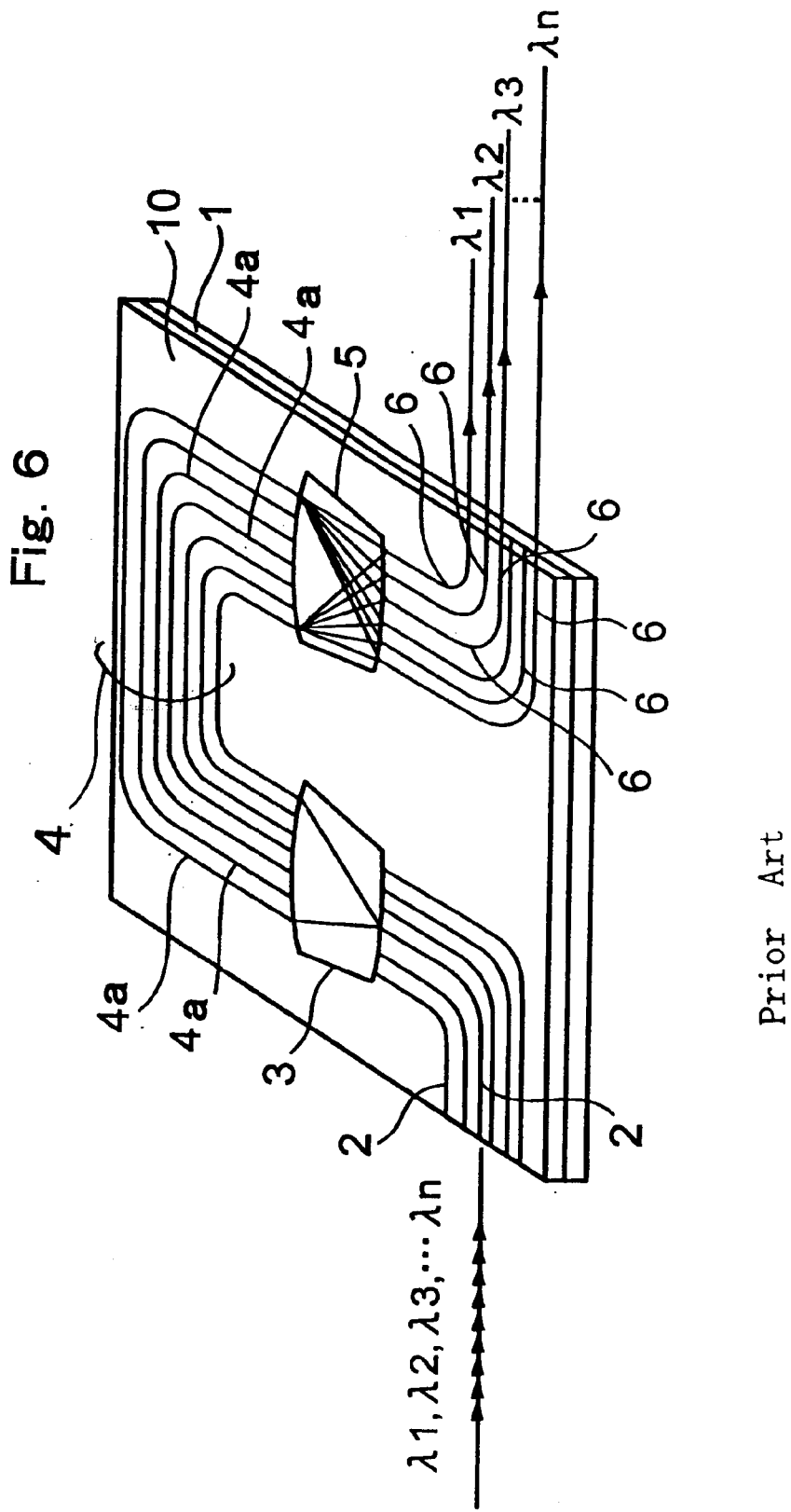

ARRAYED WAVEGUIDE GRATING

FIELD OF THE INVENTION

The invention relates to an arrayed waveguide grating that is used as at least either of an optical multiplexer, an optical demultiplexer, or an optical multiplexer and demultiplexer in, for example, optical wavelength division multiplexing communications, etc.

BACKGROUND OF THE INVENTION

Recently, in optical communications, research and development have been carried out with respect to optical wavelength division multiplexing communications as a method for remarkably increasing the transmission capacity, and practical use thereof has been increasingly employed. The optical wavelength division multiplexing communications are used, for example, to transmit a plurality of light having wavelengths different from each other. In such a system of optical wavelength division multiplexing communications, in order to pick up light per wavelength at the light receiving side from multiplexed light that has been transmitted, it is indispensable that an optical transmission device that can transmit only light of predetermined wavelengths is provided in the systems.

As one of the examples of optical transmission devices, there is an arrayed waveguide grating (AWG) of a planar lightwave circuit (PLC) as shown in FIG. 6. The arrayed waveguide grating is such that a waveguide-formed area 10 provided with a waveguide construction as shown in FIG. 6 is formed of silica-based glass, etc., on a substrate 1 made of silicon or the like.

A waveguide of the arrayed waveguide grating includes; one or more optical input waveguides 2 arranged side by side; a first slab waveguide 3 connected to the output end of the optical input waveguides 2; an arrayed waveguide 4 consisting of a plurality of channel waveguides 4a arranged side by side, connected to the output end of the first slab waveguide 3; a second slab waveguide 5 connected to the output end of the arrayed waveguide 4; and a plurality of optical output waveguides 6 arranged side by side connected to the output end of the second slab waveguide.

The above-described arrayed waveguide 4 propagates light introduced from the first slab waveguide 3. The channel waveguides 4a of the arrayed waveguide 4 are formed so as to have lengths different by a set amount from each other, wherein the lengths of channel waveguides 4a adjacent to each other differ by ΔL from each other. Further, the optical output waveguides 6 are provided, for example, so as to correspond to the number of signal lights having wavelengths different from each other, which are demultiplexed or multiplexed by an arrayed waveguide grating. The channel waveguides 4a are usually provided in a large number, for example, 100 wavegides. However, in FIG. 6, in order to simplify the drawing, the number of the respective optical output waveguides 6, channel waveguides 4a and optical input waveguides 2 are simplified for illustration.

For example, a transmission side optical fiber (not shown) is connected to one of optical input waveguides 2 so that the wavelength multiplexed light is introduced thereinto. The light that is introduced into the first slab waveguide 3 through the corresponding optical input waveguide 2 spreads due to its diffraction effect and enters respective channel waveguides 4a. Then, it propagates through the arrayed waveguide 4.

The light that has propagated through the arrayed waveguide 4 reaches the second slab waveguide 5, and is condensed at the optical output waveguides 6 and is outputted therefrom. At this time, since the lengths of all the channel waveguides 4a differ by a set amount from each other, a deviation occurs in individual phases of the light that has propagated through the arrayed waveguide 4, the phasefront of the lights may be inclined according to the deviation, and the position of light condensation is determined on the basis of the angle of inclination.

Therefore, the light condensing positions of light of different wavelengths differ from each other, wherein, by forming the optical output waveguides 6 at the positions, it is possible to output light of different wavelengths (demultiplexed light) from the optical output waveguides 6 differing per wavelength.

That is, the arrayed waveguide grating has an optically demultiplexing feature by which light of one or more wavelengths is demultiplexed from multiplexed light of a plurality of wavelengths different from each other, which is inputted from one of optical input waveguides 2, and is outputted from respective optical output waveguides 6. The center wavelength of demultiplexed light is proportional to a difference (ΔL) in the length between the adjacent of the channel waveguides 4a and its effective refractive index $n_c$.

Since the arrayed waveguide grating has the above-described characteristic, the arrayed waveguide grating can be used as an optical demultiplexer for optical wavelength division multiplexing transmission systems. For example, as shown in FIG. 6, if wavelength multiplexed light of wavelengths $\lambda 1, \lambda 2, \lambda 3, \ldots \lambda n$ (n is an integral number not less than 2) is inputted from one of optical input waveguides 2, the light of the respective wavelengths is spread by the first slab waveguide 3 and reaches the arrayed waveguide 4. And, the light is condensed at positions differing from each other according to the wavelengths, as described above, passing through the second slab waveguide 5. Then, the light is made incident into the optical output waveguides 6 different from each other, and is outputted from the output end of the optical output waveguides 6, passing through the respective optical output waveguides 6.

And, by connecting optical fibers (not shown) for optical output to the output end of the respective optical output waveguides 6, the light of the respective wavelengths can be picked up via the optical fibers.

Also, when optical fibers (an optical fiber) are (is) connected to the respective optical output waveguides 6 and the above-described one of the optical input waveguides 2 respectively, an optical fiber arraying tool, in which optical fibers (an optical fiber) are (is) arrayed and fixed in a state of the primary array, is prepared, and the optical fiber array is fixed at the connection end faces of the optical output waveguides 6 and one of the optical input waveguides 2 respectively, wherein the optical fibers (an optical fiber) are (is) connected to the optical output waveguides 6 and one of the optical input waveguides 2 respectively.

In addition, since the arrayed waveguide grating utilizes the principal of light reciprocity (reversibility), it has a function as an optical demultiplexer and a function as an optical multiplexer. That is, contrary to FIG. 6, if light of a plurality of wavelengths different from each other is taken in, wavelength by wavelength, from respective optical output waveguides 6, the light passes through the propagation channel contrary to the above, and is multiplexed by the arrayed waveguide 4. The light is outputted from one of optical input waveguides 2 as wavelength-multiplexed light.

In such an arrayed waveguide grating, as described above, the wavelength resolution of the arrayed waveguide grating is proportional to a difference (ΔL) in the lengths of the adjacent channel waveguides 4a that constitute the arrayed waveguide grating. Therefore, by designing the ΔL to become large, it becomes possible to demultiplex and multiplex wavelength multiplexed light of a narrow wavelength interval that cannot be achieved in the prior art of optical demultiplexer/multiplexer. Therefore, it is necessary to achieve high bit-rate optical wavelength multiplexed communications. The arrayed waveguide grating can have functions for optical demultiplexing/multiplexing of a plurality of signal lights, that is, functions for demultiplexing or multiplexing a plurality of signal lights whose wavelength interval is 1 nm or less.

When producing the above-described arrayed waveguide grating, for example, first, by using a flame hydrolysis deposition method, an under-cladding and core are formed on a substrate 1 made of silicon, etc., in that order. Thereafter, an arrayed waveguide grating pattern is transcribed on the core by using the photolithography via a photo mask on which a waveguide construction of the arrayed waveguide grating is formed and reactive ion etching method. After that, an over-cladding is formed by using the flame hydrolysis deposition method again, whereby a waveguide-formed area is constructed, and an arrayed waveguide grating is produced.

SUMMARY OF THE INVENTION

It is therefore an object of the invention to provide an arrayed waveguide grating that can further improve the quality of optical wavelength division multiplexing communications in comparison with prior art optical wavelength division multiplexing communications. Therefore, an arrayed waveguide grating according to one of the aspects of the invention is constructed so as to be an arrayed waveguide grating in which a waveguide-formed area having a waveguide is formed on a substrate, wherein the waveguide includes:

one or more optical input waveguides arranged side by side;

a first slab waveguide connected to the output end of the above-described optical input waveguides;

an arrayed waveguide consisting of a plurality of channel waveguides arranged side by side, each having a length different by a set amount from each other, that are connected to the output end of the above-described first slab waveguide and propagate light introduced from the corresponding first slab waveguide;

a second slab waveguide connected to the output end of the above-described arrayed waveguide;

a plurality of optical output waveguides arranged side by side connected to the output end of the above-described second slab waveguide;

wherein the focal length of the above-described first slab waveguide and that of the second slab waveguide are established to become different from each other;

a continuous separation plane is formed so as to intersect with both the light channel of the first slab waveguide and the light channel of the second slab waveguide;

the above-described waveguide-formed area is divided into the first waveguide-formed area including the above-described optical input waveguides and the above-described optical output waveguides, and the second waveguide-formed area including the above-described arrayed waveguide by the above-described separation plane; and a slide movement mechanism is provided, which causes at least one of the second waveguide-formed area and the first waveguide-formed area to slidingly move along the above-described separation plane.

Also, an arrayed waveguide grating according to another aspect of the invention is constructed so as to be an arrayed waveguide grating in which a waveguide-formed area having a waveguide is formed on a substrate, wherein the waveguide includes:

one or more optical input waveguides arranged side by side;

a first slab waveguide connected to the output end of the above-described optical input waveguides;

an arrayed waveguide consisting of a plurality of channel waveguides arranged side by side, each having a length different by a set amount from each other, that are connected to the output end of the above-described first slab waveguide and propagates light introduced from the corresponding first slab waveguide;

a second slab waveguide connected to the output end of the above-described arrayed waveguide;

a plurality of optical output waveguides arranged side by side connected to the output end of the above-described second slab waveguide;

wherein the first slab center axis that is the center axis of the above-described first slab waveguide in its optical advancing direction and the second slab center axis that is the center axis of the above-described second slab waveguide in its light advancing direction are not established to be parallel to each other;

a continuous separation plane is formed along a separation line passing through the above-described first and second slab waveguides;

the relationship between an angle θ1 formed by the above-described separation plane and the above-described first slab center axis and an angle θ2 formed by the above-described separation plane and the above-described second slab center axis is θ1≠θ2, and is established to be (180°−θ1)≠θ2;

the above-described waveguide-formed area is divided into the first waveguide-formed area including the above-described optical input waveguides and the above-described optical output waveguides and the second waveguide-formed area including the above-described arrayed waveguide by the above-described separation plane; and a slide movement mechanism is provided, which causes at least one of the second waveguide-formed area and the first waveguide-formed area to slidingly move along the above-described separation plane.

BRIEF DESCRIPTION OF THE DRAWINGS

Exemplary embodiments of the invention will now be described in conjunction with the drawings in which:

FIG. 6 is an exemplary view showing the waveguide construction of a prior arrayed waveguide grating together with the examples of operation thereof.

DETAILED DESCRIPTION

Figure 1A:
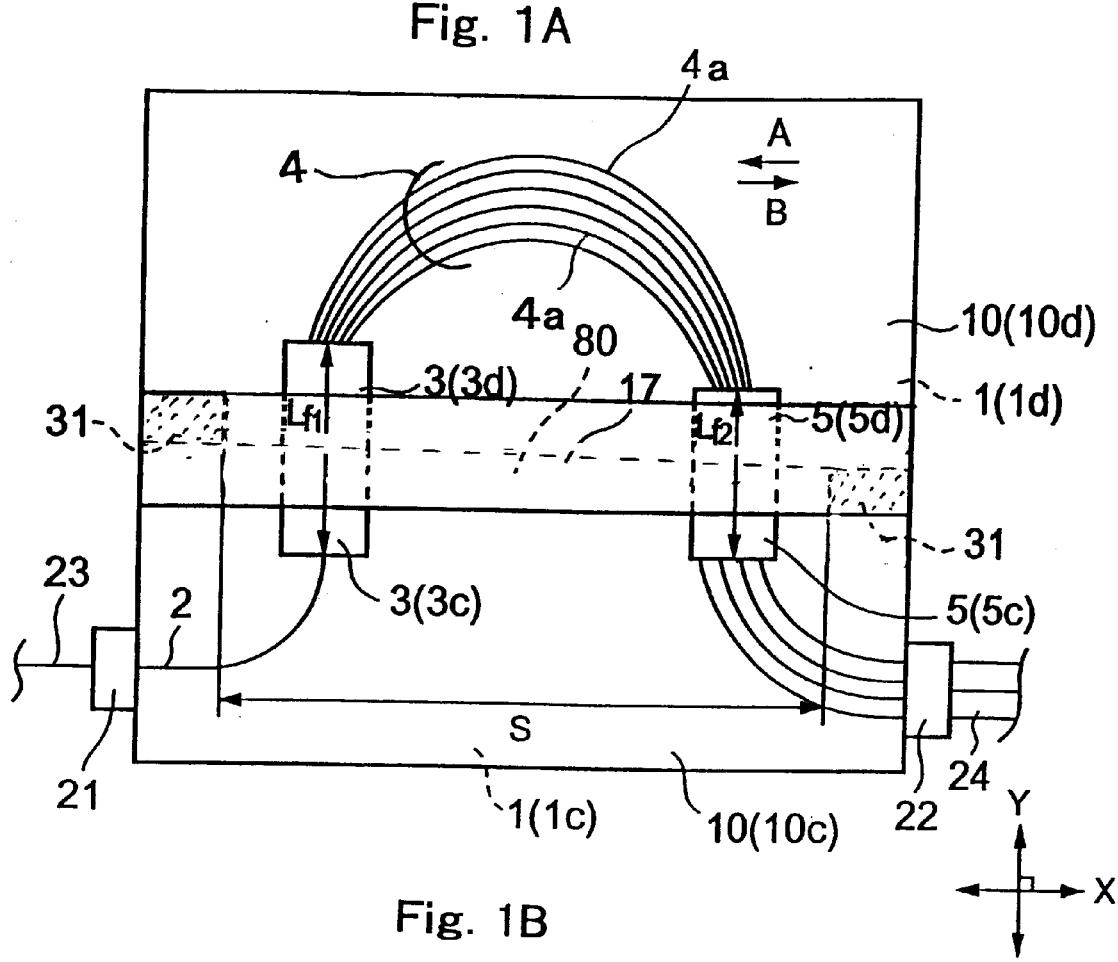
FIG. 1A and FIG. 1B are construction views showing the major parts of a first embodiment of an arrayed waveguide grating according to the invention.

An arrayed waveguide grating (Refer to FIG. 6) is essentially formed of a silica-based glass material. Therefore, the center wavelength of light transmission of the arrayed waveguide grating shifts, depending on a temperature of the arrayed waveguide grating, resulting from the temperature dependency of the silica-based glass material. The temperature dependency is expressed by equation (1) where the center wavelength of transmission of light that is outputted from one optical output waveguide 6 is $\lambda$, the effective refractive index of a core that forms the above-described arrayed waveguide 4 is $n_c$, the thermal expansion coefficient of a substrate 1 (for example, silicon substrate) is $\alpha_s$, and the amount of change in the temperature of the arrayed waveguide grating is T.

$$\frac{d\lambda}{dT} = \frac{\lambda}{n_c} \frac{dn_c}{dT} + \lambda \cdot \alpha_s \quad (1)$$

Herein, in prior arrayed waveguide grating, the temperature dependency of the center wavelength of the above-described light transmission is obtained on the basis of equation (1). In the prior arrayed waveguide grating, since $dn_c/dT=1\times10^{-5}$ (° C.$^{-1}$), $\alpha_s=3.0\times10^{-6}$(° C.$^{-1)}$, $n_c=1.451$ (value at a wavelength of 1.55 $\mu$m), these expressions are substituted in equation (1).

Further, the wavelengths $\lambda$ differ with respect to the respective optical output waveguides. However, the temperature dependency is equal among the respective wavelengths B. And, since there are many cases where an arrayed waveguide grating that is used at present demultiplexes and multiplexes wavelength-multiplexed light in a wavelength band centering around 1550 nm, herein, $\lambda$=1550 nm is substituted in equation (1). If so, the temperature dependency of the center wavelength of light transmission of the prior arrayed waveguide grating becomes the value shown by equation (2):

$$\frac{d\lambda}{dT} = 0.015 \,(\text{nm}/^\circ \text{ C.}) \quad (2)$$

Also, the unit of $d\lambda/dT$ is nm/° C. For example, if the temperature of the arrayed waveguide grating changes by +20° C., the center wavelength of transmission of light outputted from the respective optical output waveguides 6 shifts by 0.30 nm to the longer wavelength side. If the change in the temperature becomes more than 70° C., the amount of shift of the center wavelength of the light transmission will become 1 nm or more.

The arrayed waveguide grating is featured in that it can demultiplex or multiplex a wavelength in a very narrow range of 1 nm or less. Since, utilizing this feature, the arrayed waveguide grating is applied to an optical wavelength division multiplexing communications, it is critical that the center wavelength of light transmission changes by the above-described amount of shift depending on the change in the temperature as described above.

Accordingly, priorly, an arrayed waveguide grating having a temperature-regulating element, which is provided with a temperature regulating means to keep the temperature of the arrayed waveguide grating constant so that the center wavelength of light transmission does not change due to the temperature, has been proposed. In order to keep the temperature of the arrayed waveguide grating constant by using the above-described temperature regulating means, a current supply of, for example, 1 W must be given to a Peltier module at all times, wherein there is the problem of an increased cost thereof. The temperature regulating module may be a heater element. However, in this case, there is a problem similar to that of the case of using a Peltier module.

The present invention is able to solve the above-described problems, and provides an arrayed waveguide grating that is capable of suppressing the temperature dependency by shifting the center wavelength of light transmission.

In an arrayed waveguide grating according to the invention, light inputted from one of the optical input waveguides is diffracted by the first slab waveguide (input side slab waveguide), and enters the respective channels of the arrayed waveguide. Also, as described above, the lengths of the channel waveguides adjacent to each other are different by AL from each other. Therefore, the light that has propagated through the arrayed waveguide meets the following equation (3) and is condensed at the output end of the second slab waveguide (output side slab waveguide).

$$n_s \cdot d \cdot \sin \phi + n_c \cdot \Delta L = m \cdot \lambda \quad (3)$$

wherein $n_s$ is the effective refractive index of the first slab waveguide and second slab waveguide, $n_c$ is the effective refractive index of the arrayed waveguide, $\phi$ is a diffraction angle, m is a diffraction order, d is a distance between the adjacent channel waveguides that constitute the arrayed waveguide, $\lambda$ is, as described above, the center wavelength of transmission of light that is outputted from the respective optical output waveguides.

Herein, where it is assumed that the center wavelength of light transmission when the diffraction angle $\phi$=0 is $\lambda_0$, the $\lambda_0$ is expressed by the expression (4). In addition, the wavelength $\lambda_0$ is generally called the "center wavelength" of the arrayed waveguide grating.

$$\lambda_0 = \frac{n_c \cdot \Delta L}{m} \quad (4)$$

Figure 2A:
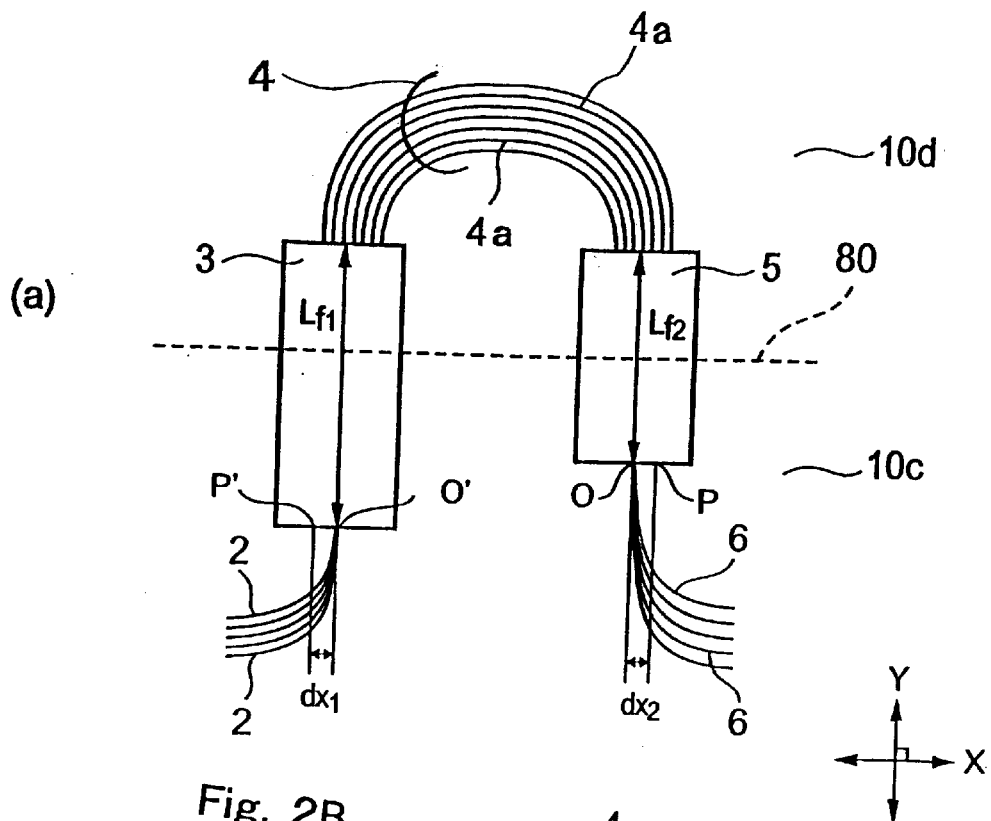
FIG. 2A and FIG. 2B are exemplary views schematically showing examples of operation of an arrayed waveguide grating that has the basic construction similar to that of the above-described first embodiment.

However, in an arrayed waveguide grating in which the focal length of the first slab waveguide and the focal length of the second slab waveguide are established to be different from each other, as shown in, for example, FIG. 2A, where it is assumed that the focal length of the first slab waveguide 3 is $L_{f1}$ and the focal length of the second slab waveguide 5 is $L_{f2}$, linear dispersion in the optical input waveguides side is expressed by equation (5), and linear dispersion in the optical output waveguides side is expressed by equation (6).

$$\frac{dx_1}{d\lambda_1} = \frac{L_{f1} \cdot \Delta L}{n_s \cdot d \cdot \lambda_0} n_g \quad (5)$$

-continued $$\frac{dx_2}{d\lambda_2} = \frac{L_{f2} \cdot \Delta L}{n_s \cdot d \cdot \lambda_0} n_g \qquad (6)$$

Also, in equations (5) and (6), $n_g$ is a group refractive index of the channel waveguides 4*a*, and the group refractive index $n_g$ of the channel waveguides 4*a* is given by equation (7) on the basis of the effective refractive index $n_c$ of the arrayed waveguide $$n_g = n_c - \lambda_0 \frac{dn_c}{d\lambda} \qquad (7)$$

In addition, in an arrayed waveguide grating according to further another aspect of the invention, a continuous separation plane is formed, which intersects with both the light channel of the first slab waveguide and light channel of the second slab waveguide. And, by the separation plane, the waveguide-formed area that forms a waveguide of the arrayed waveguide grating is divided into the first waveguide-formed area 10*c* including the optical input waveguide 2 and optical output waveguide 6, and the second waveguide-formed area 10*d* including the above-described arrayed waveguide 4.

Figure 2B:
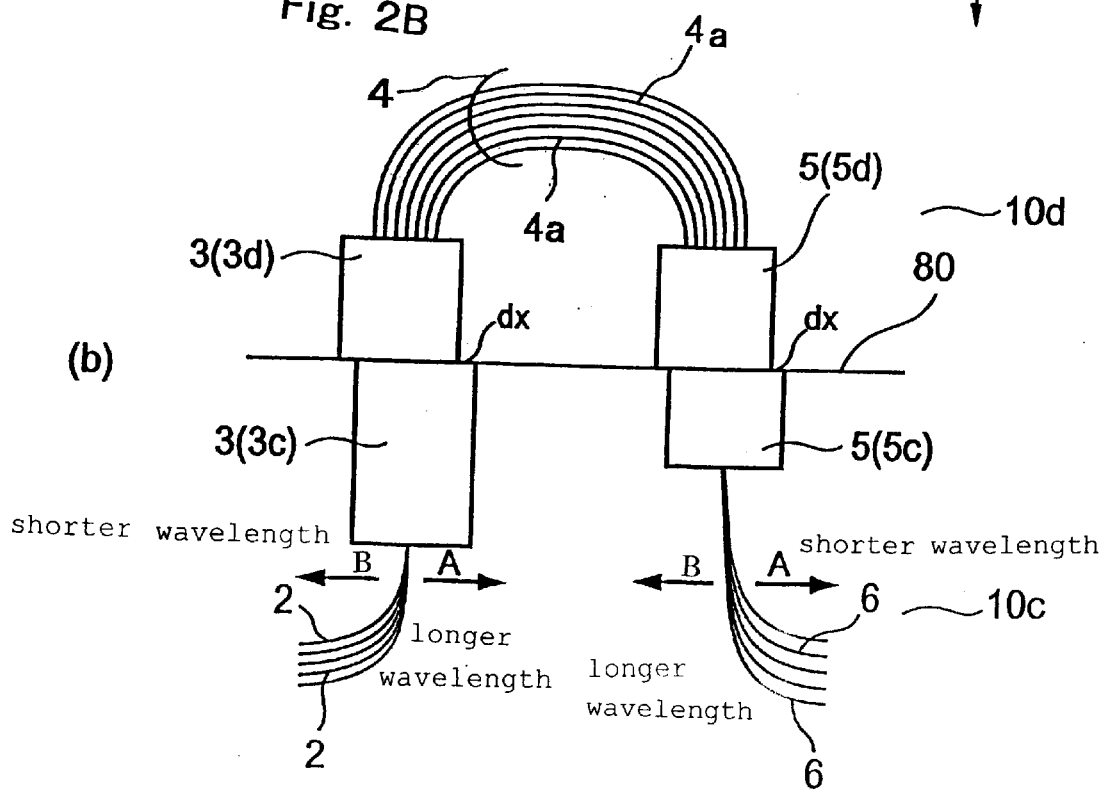

Herein, as shown in FIG. 2B, where it is assumed that a separation plane 80 is formed, and at least one of the first waveguide-formed area 10*c* and the second waveguide-formed area 10*d* is caused to shift by a distance dx along the separation plane 80, dx=$dx_1$=$dx_2$ can be established. Based on this relationship, equation (8) can be introduced. Also, FIG. 2B shows that the second waveguide-formed area l0d side is shifted by a distance dx to the left side of the drawing along the separation plane 80.

$$d\lambda_2 = \frac{L_{f1}}{L_{f2}} d\lambda_1 \qquad (8)$$

Further, as shown in FIG. 2B, if the second waveguide-formed area 10*d* side is caused to shift to the left side of the drawing along the separation plane (or the first waveguide-formed area 10*c* is caused to shift to the right side along the separation plane 80), the optical input waveguides 2 and optical output waveguides 6 relatively move in the direction of the arrow (A) in the drawing. If so, the center wavelength of light transmission shifts from the linear dispersion in the optical input waveguides side of the first slab waveguide by $d\lambda_1$ to a longer wavelength side at the optical input side. Similarly, the center wavelength of light transmission shifts from the linear dispersion in the optical output waveguides side of the second slab waveguide by $d\lambda_2$ to a shorter wavelength side at the optical output side.

Herein, where it is assumed that the shift of the center wavelength of light transmission to a longer wavelength side is positive (+) and the shift thereof to a shorter wavelength side is negative (−), the amount of shift d) of the center wavelength of light transmission in the entire arrayed waveguide grating can be obtained by equation (9).

$$d\lambda = d\lambda_1 - d\lambda_2 = \left(1 - \frac{L_{f1}}{L_{f2}}\right) d\lambda_1 \qquad (9)$$

Also, $d\lambda_1$ is expressed by equation (10) based on the linear dispersion at the optical input waveguides side (that is, based on equation (5)).

$$d\lambda_1 = \frac{n_g \cdot d \cdot \lambda_0}{L_{f1} \cdot \Delta L \cdot n_g} dx_1 \qquad (10)$$

Further, since $dx_1$=$dx_2$=dx is established in the arrayed waveguide grating according to one example shown in FIG. 2A and FIG. 2B of the invention, $dx_1$ is rewritten to be dx, wherein equation is made into equation (11), and equation (12) can be introduced from equation (11).

$$d\lambda = \left(1 - \frac{L_{f1}}{L_{f2}}\right) \frac{n_s \cdot d \cdot \lambda_0}{L_{f1} \cdot \Delta L \cdot n_g} dx \qquad (11)$$

$$dx = \frac{L_{f1} \cdot \Delta L \cdot n_g}{\left(1 - \frac{L_{f1}}{L_{f2}}\right) n_s \cdot d \cdot \lambda_0} \qquad (12)$$

And, as shown in FIG. 2B, since a slide movement mechanism is provided, which causes at least one of the second waveguide-formed area 10*d* and the first waveguide-formed area 10*c* to slide in the direction of the substrate surface along the above-described separation plane 80, at least one side of the first and second waveguide-formed areas 10*c* and 10*d* is caused to move along the separation plane 80, whereby it becomes possible to shift the center wavelength of light transmission of the arrayed waveguide grating.

In addition, as shown in FIG. 2A and FIG. 2B, if at least one of the first and second waveguide-formed areas 10*c* and 10*d* is caused to move in the moving direction shown in FIG. 2B where it is assumed that the focal length $Lf_1$ of the first slab waveguide 3 and the focal length $Lf_2$ of the second slab waveguide 5 is established to be $L_{f1}$>$L_{f2}$, the shifting direction of the center wavelength of light transmission of the entire arrayed waveguide grating is made into the shorter wavelength direction on the basis of equation (11).

Also, the amount dx of slide movement of the first waveguide-formed area 10*c* is obtained in advance from equation (12) in compliance with an appointed shift in wavelength dλ of the central wavelength of light transmission, wherein, if at least one of the first and second waveguide-formed areas 10*c* and 10*d* is moved by the amount of the slide movement along the separation plane 80, it becomes possible to shift the center wavelength of light transmission of the arrayed waveguide grating by only the set amount of the wavelength to the shorter or longer wavelength side.

Also, since the shifting direction of the center wavelength of light transmission of the entire arrayed waveguide grating is corresponds to (or depends on) a shifting direction of at least one of the first and second waveguide-formed areas 10*c* and 10*d* and the focal lengths of the first and second slab waveguides 3 and 5, the shifting direction of the first or second waveguide-formed area 10*c* or 10*d* and the focal lengths of the first or second slab waveguide 3 or 5 may be set so that they become a desired shifting direction of the center wavelength of light transmission.

Also, as described above, since the center wavelength of the arrayed waveguide grating has the temperature dependency, if the amount of shift of the center wavelength of light transmission is Δλ due to a change ΔT in temperature, Δλ may be expressed by equation (13).

$$\Delta\lambda = \frac{d\lambda}{dT}\Delta T \qquad (13)$$

Therefore, since $\Delta\lambda = d\lambda$ may be established in order to compensate (counterbalance) the amount $\Delta\lambda$ of shift of the center wavelength of light transmission due to a temperature change $\Delta T$ by the amount of wavelength shift based on the above-described linear dispersion, the amount dx of shift of the first waveguide-formed area 10c, which is necessary to compensate the amount $\Delta\lambda$ of shift of the center wavelength of light transmission due to the temperature change $\Delta T$ may become a value that can meet equation (14).

$$dx = \frac{L_{f1} \cdot \Delta L \cdot n_g}{\left(1 - \frac{L_{f1}}{L_{f2}}\right) n_s \cdot d \cdot \lambda_0}(-\Delta\lambda) \qquad (14)$$

Accordingly, if the focal lengths of the first and second slab waveguides are set to adequate values and at least one of the first and second waveguide-formed areas is caused to move by the amount dx of shift that meets equation (14), it becomes possible to slide, by the slide movement mechanism, at least one of the first waveguide-formed area and the second waveguide-formed area along the separation plane in the direction to reduce the temperature dependency of the center wavelength of light transmission of the arrayed waveguide grating. Therefore, it becomes possible to compensate the temperature dependency of the center wavelength of light transmission of an arrayed waveguide grating so that it becomes almost zero.

Figure 3:
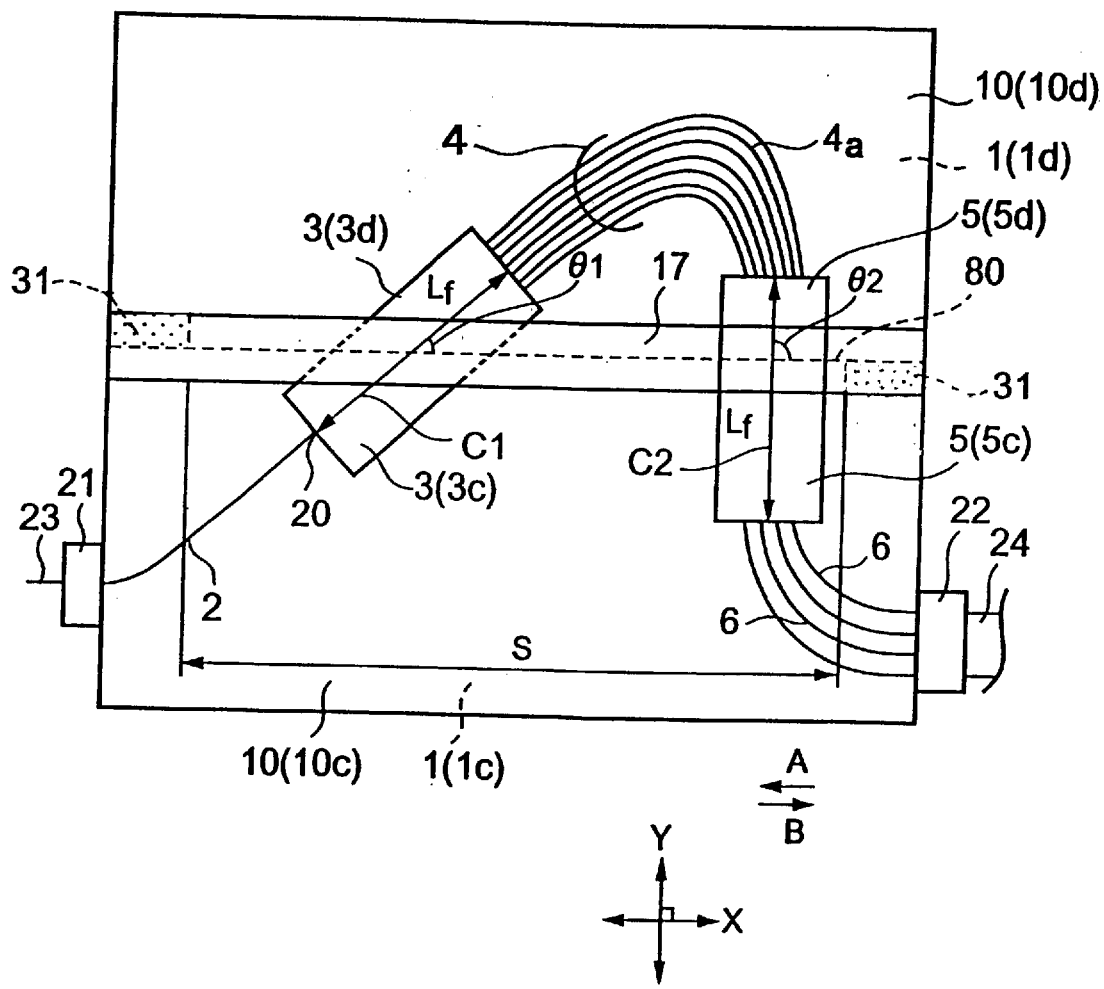
FIG. 3 is a construction view of the major parts showing a second embodiment of an arrayed waveguide grating according to the invention.

On the other hand, an arrayed waveguide grating according to the mode shown in FIG. 3 of the invention is constructed so that the first slab center axis being the center axis of the first slab waveguide in the light advancing direction is not parallel to the second slab center axis being the center axis of the above-described second slab waveguide in the light advancing direction. And, where the waveguide of the arrayed waveguide grating is formed as shown in, for example, FIG. 4A, the focal length of the first slab waveguide 3 and the focal length of the second slab waveguide 5 are equal to be $L_f$.

In this case, the linear dispersion in the optical input waveguides side of the first slab waveguide is expressed by equation (15), and the linear expression in the optical output waveguides side of the second slab waveguide is expressed by equation (16)

$$\frac{dx'}{d\lambda'} = \frac{L_f \cdot \Delta L}{n_s \cdot d \cdot \lambda_0} n_g \qquad (15)$$

$$\frac{dx}{d\lambda} = \frac{L_f \cdot \Delta L}{n_s \cdot d \cdot \lambda_0} n_g \qquad (16)$$

Figure 4A:
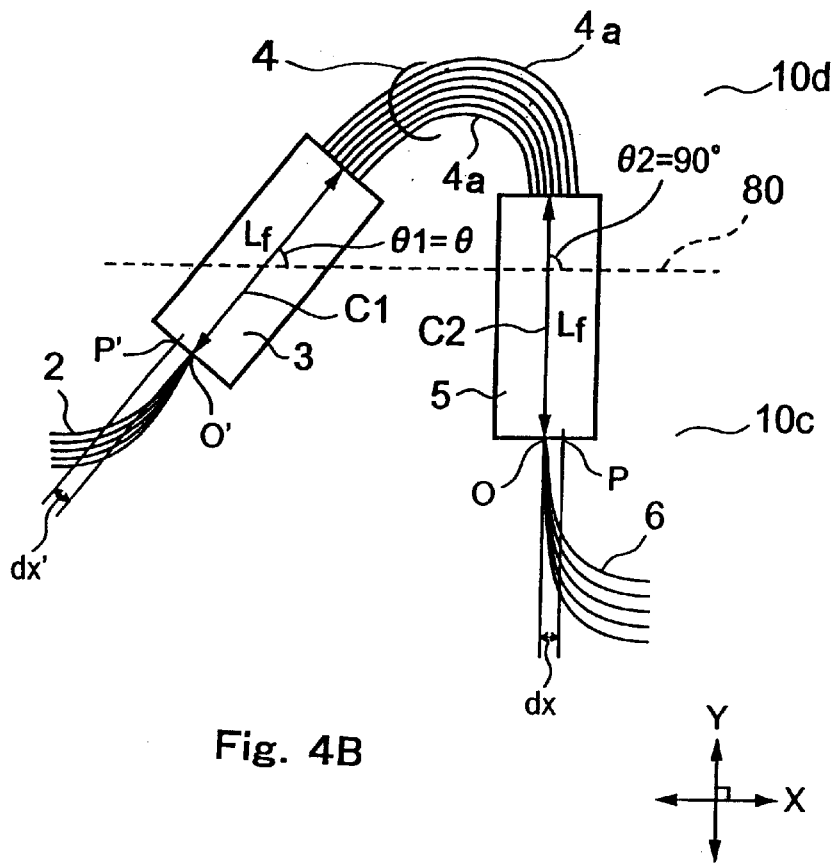
FIG. 4A and FIG. 4B are exemplary views showing examples of operation of an arrayed waveguide grating that has the basic construction similar to that of the above-described second embodiment.

Also, in the arrayed waveguide grating according to one mode of the invention, in which a separation plane is formed along the continuous separation line passing through the first and second slab waveguides, an angle formed by the corresponding separation plane and the above-described first slab center axis is $\theta 1$ while an angle formed by the above-described separation plane and the above-described second slab center axis is $\theta 2$, the relationship therebetween is $\theta 1 \neq \theta 2$, and $(180°-\theta 1) \neq \theta 2$, a separation plane 80 is formed in the mode shown in FIG. 4A, whereby, for example, $\theta 1=0$ and $\theta 2=90°$.

Figure 4B:
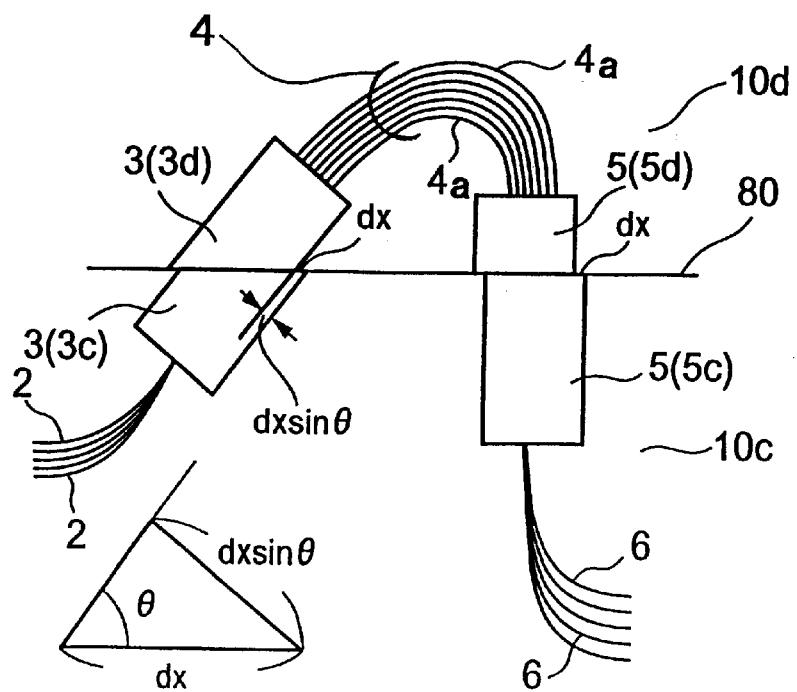

In addition, in the arrayed waveguide grating of such a type as shown in FIG. 4A and FIG. 4B, since, by the separation plane 80, the waveguide-formed area that constitutes waveguides of the arrayed waveguide grating is divided into the first waveguide-formed area 10c including the above-described optical input waveguides 2 and the above-described optical output waveguides 6 and the second waveguide-formed area 10d including the above-described arrayed waveguide 4 as shown in, for example, FIG. 4B, equation (17) can be established if an examination is made of a case where at least one of the first waveguide-formed area 10c and the second waveguide-formed area 10d is shifted by a distance dx along the separation plane 80. Based on the relationship therebetween, equation (18) can be derived therefrom.

$$dx' = dx \cdot \sin\theta \qquad (17)$$

$$d\lambda = \frac{1}{\sin\theta} d\lambda' \qquad (18)$$

Herein, as shown in FIG. 4B, if an examination is made of a case where the second waveguide-formed area 10d side is shifted to the left side of the drawing along the separation plane 80, the amount $d\lambda_0$ of the center wavelength of light transmission in the entire arrayed waveguide grating can be obtained by equation (19).

$$d\lambda_0 = d\lambda' - \frac{1}{\sin\theta} d\lambda' = \left(1 - \frac{1}{\sin\theta}\right) d\lambda' \qquad (19)$$

$d\lambda'$ is expressed by equation (20) based on the linear dispersion at the optical input waveguide side (that is, from the above-described equation (15)).

$$d\lambda' = \frac{n_s \cdot d \cdot \lambda_0}{L_f \cdot \Delta L \cdot n_g} dx' = \frac{n_s \cdot d \cdot \lambda_0}{L_f \cdot \Delta L \cdot n_g} dx \cdot \sin\theta \qquad (20)$$

Therefore, equation (21) can be derived from equations (19) and (20).

$$dx = \frac{L_f \cdot \Delta L \cdot n_g}{(\sin\theta - 1) n_s \cdot d \cdot \lambda_0} d\lambda_0 \qquad (21)$$

And, as shown in FIG. 3, a slide movement mechanism is provided, which causes at least one of the second waveguide-formed area and the first waveguide-formed area to move along the above-described separation plane. Therefore, if one side of the first and second waveguide-formed areas 10c and 10d is moved along the separation plane 80 by the slide movement mechanism as shown in, for example, FIG. 4B, it becomes possible to shift the center wavelength of light transmission of an arrayed waveguide grating.

Also, if an amount dx of slide movement of the first waveguide-formed area 10c is obtained from equation (21) in compliance with an appointed shift wavelength dk of the central wavelength of light transmission, and one side of the first and second waveguide-formed areas 10c and 10d is moved by the amount of slide movement along the separation plane, it becomes possible to shift the center wavelength of light transmission of the arrayed waveguide grating by only the amount of wavelength set in advance.

In addition, since the shifting direction of the center wavelength of light transmission of the entire arrayed waveguide grating corresponds to the moving direction of at least one of the first and second waveguide-formed areas 10c and 10d, the angle θ1 formed by the separation plane 80 and the of first slab center axis, and the angle θ2 formed by the separation plane 80 and the second slab center axis, the moving direction of the first or the second waveguide-formed area 10c or 10d, and angles θ1 and θ2 may be set so that the shifting direction becomes an appointed shifting direction.

Also, as described above, since the temperature dependency of the center wavelength of light transmission of an arrayed waveguide grating can be expressed by equation (13), Δλ=dλ is established in order to compensate (counterbalance) the amount Δλ of shift of the central wavelength of light transmission due to a temperature change ΔT by the amount of wavelength shift on the basis of the above-described linear dispersion, wherein if the amount dx of movement of the first waveguide-formed area 10c is necessary to compensate the amount Δλ of shift of the center wavelength of light transmission due to a temperature change ΔT, it can become as in equation (22), and the amount dx of movement may become a value that meets equation (22).

$$dx = \frac{L_f \cdot \Delta L \cdot n_g}{(\sin\theta - 1) n_s \cdot d \cdot \lambda_0}(-\Delta\lambda) \qquad (22)$$

Therefore, in the arrayed waveguide grating of such a type as shown in FIG. 3 according to the invention, it becomes possible that the focal lengths of the first and second slab waveguides are set to the same adequate value, and at least one of the first waveguide-formed area and the second waveguide-formed area is caused to slide and move, by only the amount dx of shift that meets equation (22), along the separation plane in the direction to reduce the temperature dependency of the center wavelength of light transmission of the arrayed waveguide grating by the slide movement mechanism. Thereby, it becomes possible to compensate the temperature dependency of the center wavelength of light transmission of the arrayed waveguide grating so as to become almost zero.

In either of the arrayed waveguide gratings shown in FIG. 1 and FIG. 3, the waveguide-formed area of the arrayed waveguide grating is divided, by the separation plane, into the first waveguide-formed area including the optical input waveguides and the optical output waveguides and the second waveguide-formed area including the above-describe arrayed waveguides.

Hereinafter, a description is given of further detailed embodiments of the invention with reference to the accompanying drawings. Also, in the description of the following embodiments, parts which are the same as those of the prior art example shown in FIG. 6 are given the same reference numbers, and overlapping description thereof is omitted or simplified. FIG. 1 shows the construction of the major parts of the first embodiment of an arrayed waveguide grating according to the invention, using a plan view.

The waveguide construction formed in the arrayed waveguide grating according to the embodiment is almost the same as the waveguide construction of an arrayed waveguide grating of the prior art example shown in FIG. 6. However, in the first embodiment, the focal length of the first slab waveguide 3 and the focal length of the second slab waveguide 5 are established to differ from each other. In detail, the focal distance of the first slab waveguide 3 is made into $L_{f1}$, and the focal distance of the second slab waveguide 5 is made into $L_{f2}$.

In addition, in the first embodiment, a continuous separation plane 80 that intersects with both the light channel of the first slab waveguide 3 and the light channel of the second slab waveguide 5 is formed. The waveguide-formed area 10 is divided, by the separation plane 80, into the first waveguide-formed area 10c including the above-described optical input waveguide 2 and optical output waveguide 6, and the second waveguide-formed area 10d including the above-described waveguide 4. Also, by the separation plane 80, the first slab waveguide 3 is divided into the separated slab waveguides 3c and 3d, and the second slab waveguide 5 is divided into the separated slab waveguides 5c and 5d.

Further, in the first embodiment, a slide movement member 17 is provided in the mode of stretching over the first waveguide-formed area 10c and the second waveguide-formed area 10d. And, a slide movement mechanism is formed, which is provided with the slide movement member 17 and causes the above-described second waveguide-formed area 10d to slide and move along the above-described separation plane 80.

As an example, the slide movement member 17 is made of a copper plate whose thermal expansion coefficient is $1.65 \times 10^{-5}$ (1/K). The thermal expansion coefficient is larger than that of the substrate 1 or the waveguide-formed area 10. And, both-side end parts of the slide movement member 17 are fixed on the first and second waveguide-formed areas 10c and 10d, for example, by the metal films 31 formed at the positions with solid lines in FIG. 1B and solder (not shown) secured at the upper side of the corresponding film 31.

That is, in one embodiment of the invention, the metal film 31 is formed at the right upper end part of the first waveguide-formed area 10c and the left lower end part of the second waveguide-formed area 10d, respectively, and the slide movement member 17 is not fixed at parts of the first and second waveguide-formed areas 10c and 10d at parts other than the portion where the metal films 31 are formed. Also, as one example, the metal films 31 are, respectively, formed to be a square of 5 mm×5 mm, wherein the interval S between the metal films 31 is, for example, 58.2 mm.

In addition, the metal films 31 are provided to increase the adhesivity between the surface (glass surface) of the waveguide-formed area 10 and the above-described solder, and the solder is provided to adhere the metal films 31 and the slide movement member 17 together.

Also, in an embodiment of the invention, respective parameters in the waveguide construction of the arrayed waveguide grating are the values shown below. That is, the focal length $L_{f1}$ of the first slab waveguide 3 is 15,000 μm, the focal length $L_{f2}$ of the second slab waveguide is 9,000 μm, the difference ΔL in length between the adjacent channel waveguides 4a is 65.2 μm at a temperature of 25° C., the distance d between the adjacent channel waveguides 4a is 15 μm, the effective refractive index $n_c$ of the arrayed waveguide 4 is 1.451, the group of refractive index $n_g$ of the channel waveguides is 1.475, and the center wavelength $\lambda_0$ of the arrayed waveguide grating is 1.5509 μm.

Further, in the first embodiment, an optical fiber 23 fixed at an optical fiber arraying member 21 is connected to the optical input waveguide 2, and an optical fiber (not shown) of an optical fiber ribbon 24, which is fixed at an optical fiber arraying member 22, is connected to the respective optical output waveguides 6.

And, in the first embodiment, the first waveguide-formed area 10c at the side where the above-described optical fiber is connected is fixed at a base substrate (not shown in FIG. 1A and FIG. 1B) that fixes a package (not shown) on a protection substrate. In this state, non-water soluble matching oil is filled in the package. In addition, as in the first embodiment, a method for producing an arrayed waveguide grating by being accommodated in a package filled with matching oil is disclosed in detail in Japanese Patent Application (File no. 11-299200) whose inventors are Kashihara, Nara, Saito, and Nakajima filed in Japan on Oct. 21, 1999, together with the effects thereof.

Taking note of the linear dispersion of an arrayed waveguide grating in order to suppress the temperature dependency of an arrayed waveguide grating, Kashihara and Nara who are the inventors of the present invention sought for a relationship between a temperature change $\Delta T$ and an amount dx of position compensation of the arrayed waveguide grating having the basic construction (the construction shown in, for example, FIG. 1 and FIG. 2) as in the first embodiment as in the description proposed with respect to equations (1) through (14). And, they confirmed that the relationship could be expressed by the above-described equation (14).

Therefore, with respect to the arrayed waveguide grating according to the first embodiment, if the relationship between the amount $\Delta T$ of change in temperature and the amount dx of position compensation in the arrayed waveguide grating was obtained on the basis of the values of the respective parameters of the waveguide construction of the arrayed waveguide grating and equations (2) and (14), it was found that the relationship becomes $dx=0.960\times\Delta T$.

Therefore, in the first embodiment, the interval S (the thermal elongation and contraction area of the slide movement member 17) between the metal films 31 was determined to be the above-described value (58.2 mm) corresponding to the thermal expansion coefficient of the slide movement member 17 so that, when the temperature of the arrayed waveguide grating rises by 10° C., the second waveguide-formed area 10d moves by approx. 9.60 µm in the direction of the arrow A, and contrarily when the temperature of the second waveguide-formed area falls 10° C., the second waveguide-formed area 10d moves by approx. 9.60 µm in the direction of the arrow B.

Also, in the first embodiment, where the length of the thermal elongation and contraction area of the slide movement member 17 is defined to S since the slide movement member 17 is made of copper and the thermal expansion coefficient of copper is $1.65\times10^{-5}/°$ C. as described above, if a value that meets $1.65\times10^{-5}\times(S\times10^3)=0.960$ is obtained, it becomes possible to carry out slide movement equal to the above-described amount of movement by utilizing the thermal elongation and contraction of the slide movement member 17. And, the length S of the thermal elongation and contraction area of the slide movement member 17 that meets this equation becomes S=58.2 (mm).

Figure 1B:
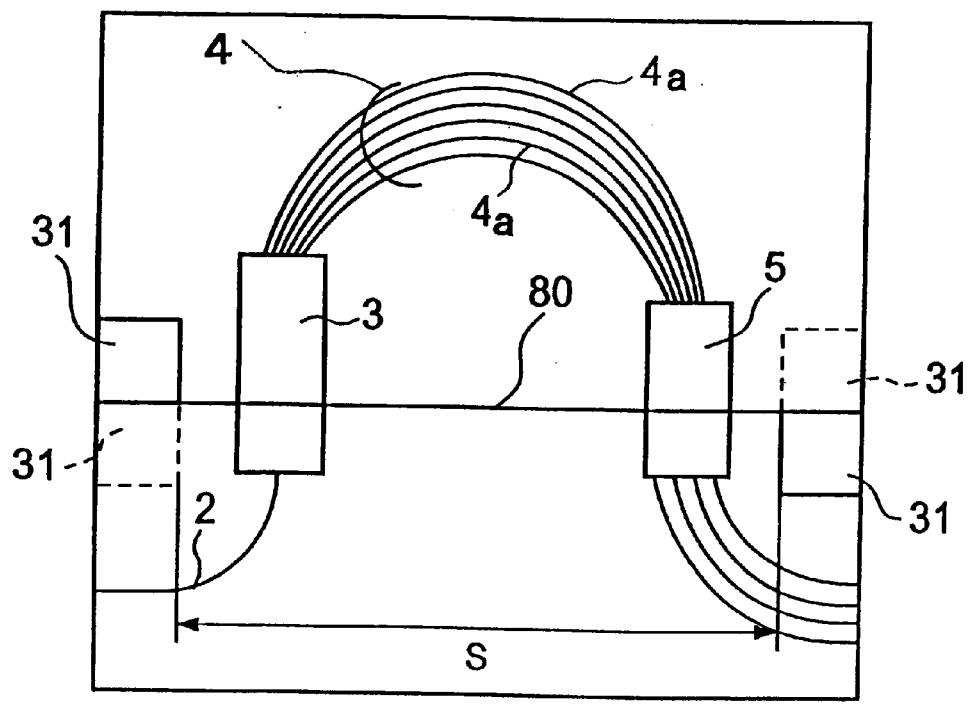

As described above, in the first embodiment, the first waveguide-formed area 10c is fixed at the above-described base substrate (not shown), and metal films 31 are formed at the portions shown in FIG. 1B as described above. The slide movement member 17 is fixed in the first and second waveguide-formed areas 10c and 10d at the portion where the metal films 31 are formed. Also, at the portions other than the formed portion of the metal films 31, the slide movement member 17 is not fixed at the first and second waveguide-formed areas 10c and 10d. Accordingly, the second waveguide-formed area 10d is caused to slide and move in the right and left directions of the drawing along the separation plane 80 by elongation and contraction due to a temperature change of the slide movement member 17.

The slide movement of the second waveguide-formed area 10d is carried out in the direction to reduce the fluctuation, in the temperature dependency, of the center wavelength of transmission of respective light of the arrayed waveguide grating. In detail, when the slide movement member 17 expands greater than the substrate 1 and waveguide-formed area 10 in line with temperature rise, the second waveguide-formed area 10d side moves by approx. 0.960 µm/° C. to the leftward side (in the direction of the arrow A in FIG. 1) as in that shown in FIG. 2B. Also, to the contrary, if the slide movement member 17 contracts greater than the substrate 1 and waveguide-formed area 10 in line with temperature drop, the second waveguide-formed area 10d side moves by approx. 0.960 µm/° C. to the rightward side (the direction of the arrow B in FIG. 1A).

Thus, in the first embodiment, the second waveguide-formed area 10d moves in the direction to reduce the fluctuation, in temperature dependency, of the center wavelength of the respective transmission light of the arrayed waveguide grating. Therefore, even if the temperature of the arrayed waveguide grating is changed, a shift of the center wavelength of light transmission due to the temperature change can be compensated, and the arrayed waveguide grating not dependent on the temperature can be provided.

Further, since the first embodiment is constructed so that the second waveguide-formed area 10d, in which the optical fiber arraying members 21 and 22 are not fixed, is caused to slide and move along the separation plane 80, the stress incidental the slide and movement can be prevented from operating on the connection part between the optical fiber arraying members 21 and 22 and the arrayed waveguide grating, and the connection of the connection part between the optical fiber arraying members 21 and 22 and the arrayed waveguide grating can be securely maintained.

Still further, according to the first embodiment, the slide movement member 17 is provided in the mode of stretching over the first waveguide-formed area 10c and the second waveguide-formed area 10d, the position with respect to the base 9 and the waveguide-formed area can be fixed at high accuracy. Therefore, in the first embodiment, it is possible to further securely improve the yield of equipment and reduce the production.

In FIG. 3, the construction of the major parts of the second embodiment of the arrayed waveguide grating according to the invention is shown, using its plan view. Also, in the second embodiment, parts that are identical to those of the first embodiment are given the same reference numbers.

The construction of a waveguide formed in the arrayed waveguide grating according to the second embodiment is almost the same as the waveguide construction of the arrayed waveguide grating of a prior art example shown in FIG. 6. However, in the second embodiment, the first slab center axis C1 being the center axis of the first slab waveguide 3 in the light advancing direction and the second slab center axis C2 being the center axis of the second slab waveguide 5 in the light advancing direction are not formed to be parallel to each other.

In addition, as shown in FIG. 3, in the second embodiment, a separation plane 80 is formed along a continuous separation line passing through the first and second slab waveguides 3 and 5. And, the relationship between an angle θ1 formed by the separation plane 80 and the above-described first slab center axis C1 and an angle θ2 formed by the separation plane 80 and the second slab center axis C2 is θ1≠θ2, and is established to be (180°−θ1)≠θ2. In addition, in the second embodiment, as in the waveguide construction shown in FIG. 4A and FIG. 4B, θ2=90° and θ1=θ are established, wherein θ1=θ=36° is established as one example.

In the second embodiment, as in the first embodiment, the waveguide-formed area 10 is divided, by the separation plane 80, into the first waveguide-formed area 10c including the above-described optical input waveguide 2 and optical output waveguide 6, and the second waveguide-formed area 10d including the above-described arrayed waveguide 4. And, a slide movement mechanism is formed, which is provided with a slide movement member 17 in the mode of stretching over the first waveguide-formed area 10c and the second waveguide-formed area 10d and causes the above-described waveguide-formed area 10d to slide and move along the separation plane 80.

In the second embodiment, the mode of forming the waveguide and separation plane 80 of the arrayed waveguide grating is different from that of the first embodiment. However, the construction of the slide movement mechanism, substrate 1 of the arrayed waveguide grating and waveguide-formed area 10 are similar to those of the above-described first embodiment. Therefore, the overlapping description is omitted.

Also, in the second embodiment, the focal lengths $L_f$ of the first and second slab waveguides 3 and 5 are made equal to each other. Herein, as one of the examples, the focal lengths $L_f$ of the slab waveguides 3 and 5 are made into 9000 $\mu$m. The above-described parameters of the arrayed waveguide grating, other than the above, are similar to those of the first embodiment. In addition, in the second embodiment, the length (internal between the metal films 31) S of the thermal elongation and contraction area of the slide movement member is made into 56.5 mm.

Taking note of the linear dispersion of an arrayed waveguide grating in order to suppress the temperature dependency of an arrayed waveguide grating, the present inventors sought for a relationship between a temperature change $\Delta T$ and an amount of position compensation of the arrayed waveguide grating having the basic construction (the construction shown in, for example, FIG. 3, FIG. 4A and FIG. 4B) as in the second embodiment as in the description proposed with respect to equations (1) through (4), (13), and (15) through (22). And, they confirmed that the relationship could be expressed by the above-described equation (22).

Therefore, with respect to the second embodiment, if the relationship between the amount $\Delta T$ of change in temperature and the amount dx of position compensation in the arrayed waveguide grating is obtained on the basis of the values of the respective parameters and equations (2) and (22), it was found that the relationship becomes dx=0.932× $\Delta T$. And, on the basis of the relationship, in the second embodiment, the interval S between the metal films 31 was determined to be above-described value (56.5 mm) so as to correspond the thermal expansion coefficient of the slide movement member 17 as in the first embodiment.

The second embodiment is constructed as described above, and slide movement is carried out by the slide movement member 17 along the separation plane 80 of the second waveguide-formed area 10d almost as in the above-described first embodiment. As has been made clear on the basis of the description given with respect to equations (1) through (4), (13) and (15) through (22), almost the same effects as those of the above-described first embodiment can be brought about.

In addition, the present invention is not limited to the respective embodiments described above, but may be subject to various modifications of modes. For example, in the respective embodiments, although the slide movement member 17 is formed of copper, the slide movement member 17 is not necessarily formed of copper, but may be formed of aluminum. The slide movement member 17 may be formed of a material whose thermal expansion coefficient is greater than that of the substrate 1 and waveguide-formed area 10 of the arrayed waveguide grating.

Also, in the respective embodiments, the slide movement member 17 is provided in the mode of stretching over the first waveguide-formed area 10c and the second waveguide-formed area 10d, thereby constituting a slide movement mechanism by which at least one of the second waveguide-formed area 10d and the first waveguide-formed area 10c is caused to slide and move in along the above-described separation plane 80. However, the slide movement mechanism is not limited to such a construction, but may be adequately constructed.

That is, the slide movement mechanism may be such that can slide and move at least one of the first waveguide-formed area 10c and the second waveguide-formed area 10d, in which the slab waveguides 3 and 5 are separated by a continuous separation plane 80 that intersects both the optical channel of the first slab waveguide 3 and the optical channel of the second slab waveguide 5.

And, if such a construction is employed, by which the center wavelength of light transmission of an arrayed waveguide grating can be shifted by a predetermined value through the above-described slide movement by the slide movement mechanism, it is possible to shift the center wavelength of light transmission of the arrayed waveguide grating by an appointed value. Also, as in the respective embodiments, if such a construction is employed, by which the fluctuation in the temperature dependency can be reduced with respect to the center wavelength of light transmission of the arrayed waveguide grating by the slide movement mechanism, it is possible to compensate the temperature dependency of the center wavelength of light transmission, and an excellent arrayed waveguide grating that is suitable for practical use in optical wavelength division multiplexing communications can be brought about.

Still further, in any one of the respective embodiments, such a construction that the first waveguide-formed area 10c side is fixed, and the second waveguide-formed area 10d side is moved along the separation plane 80 is employed. To the contrary, it may be constructed that the first waveguide-formed area 10c side is moved along the separation plane 80, and that both the first and second waveguide-formed areas 10c and 10d are moved along the separation plane 80.

However, as in the respective embodiments, if such a construction that the first waveguide-formed area 10c side is fixed, and the second waveguide-formed area 10d side is moved along the separation plane 80 is employed, the waveguide-formed area, in which the optical input waveguides 2 and optical output waveguides 6 are formed, existing at the side where the optical fiber arraying members 21 and 22 are fixed is fixed, and the waveguide-formed area at the side where the optical fiber arraying members 21 and 22 are not fixed is slid. Therefore, it is possible to prevent stress from operating on the optical fiber arraying members 21 and 22 when carrying out slide movement. This is further favorable.

In addition, in the respective embodiments, the arrayed waveguide grating is constructed so that such components as shown in FIG. 1A, FIG. 1B and FIG. 3 are accommodated in a package filled with matching oil as in the disclosure of Japanese Patent Application (File No.11-299200). However, the arrayed waveguide grating is not necessarily accommodated in a package filled with matching oil.

Also, in the respective embodiments, a metal film 31 is formed both the right upper end part of the first waveguide-formed area 10c and the left lower end part of the second waveguide-formed area 10d. However, the metal film 31 may be formed at the position shown by a broken line in FIG. 1B on the basis of the construction of waveguides of the arrayed waveguide grating, and the movement of the second waveguide-formed area 10d, which is carried out by the slide movement member 17, may be made inverse of the above-described first embodiment.

Still further, in the first embodiment, the relationship between the focal length $L_{f1}$ of the first slab waveguide 3 and the focal length $L_{f2}$ of the second slab waveguide 5 is established to be $L_{f1}>L_{f2}$. However, to the contrary, $L_{f1}<L_{f2}$ may be acceptable.

Further, in the above-described second embodiment, the angle θ1 formed by the first slab center axis C1 and the separation plane 80 is established to be θ1=36°, and the angle θ2 formed by the second slab center axis C2 and the separation plane 80 is established to be θ2=90°. However, these angles θ1 and θ2 are not specially limited hereto, but may be adequately established. For example, as shown in FIG. 5B, unless (180°−θ1)=θ2 or θ1=θ2, the angles θ1 and θ2 may be any angle other than 90° as shown in, for example, FIG. 5A.

Figure 5A:
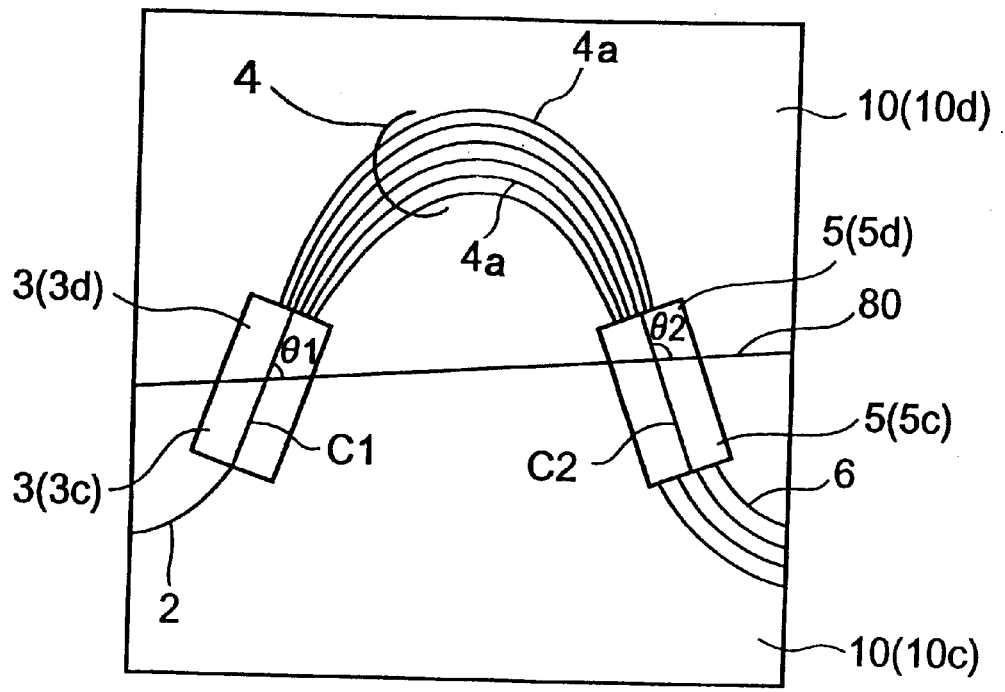
FIG. 5A is a view showing still another embodiment of an arrayed waveguide grating according to the invention.
Figure 5B:
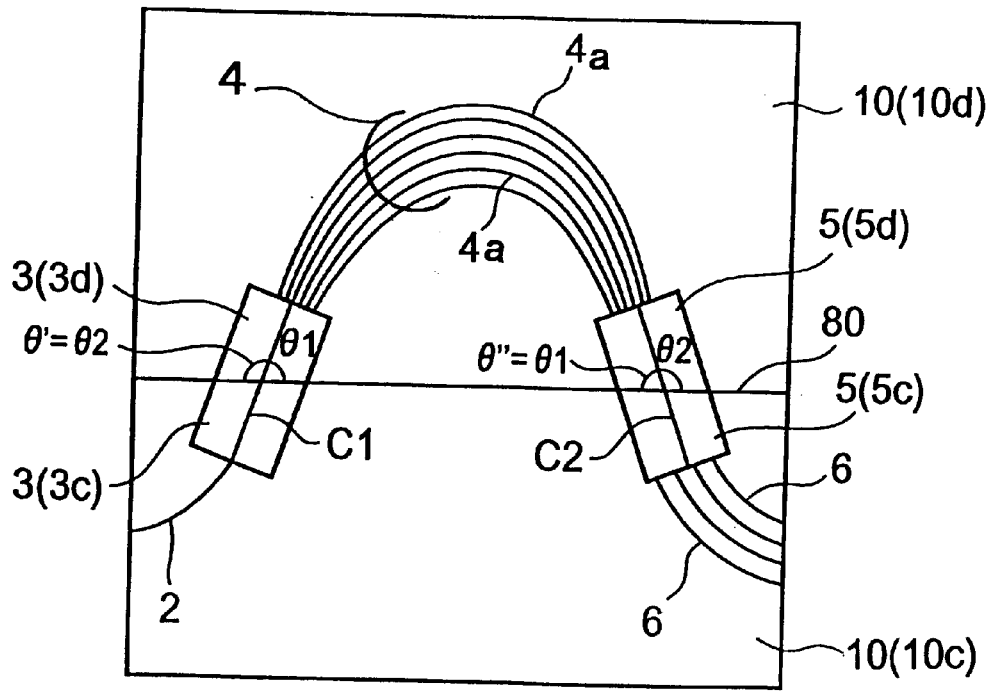
FIG. 5B is an exemplary view showing a comparative example of FIG. 5A.

And, in the construction shown in FIG. 5A, where at least one of the first and second waveguide-formed areas 10c and 10d is moved by dx in the direction X, the linear dispersion in the above-described optical output waveguides side of the second slab waveguide is expressed by an equation obtained by substituting dx×sin (180°−θ2) instead of dx in the above-described equation (16). Based on the equation, by utilizing the examination described with respect to equations (17) through (22), the relationship between the amount ΔT of temperature change of the arrayed waveguide grating and the amount dx of position compensation is obtained, and on the basis of the relationship, the composition of a member that forms the slide movement member 17 and length of the thermal elongation and contraction area of the slide movement member 17 may be determined. Thus, by carrying out actions which are almost the same as those of the above-described second embodiment, similar effects can be brought about.

Further, the detailed figures of the effective refractive index, number, and size of respective waveguides 2, 3, 4 (4a), 5 and 6, which constitute an arrayed waveguide grating according to the invention, are not specially limited, but they may be adequately established.

According to an arrayed waveguide grating of the present invention, which has the first and second embodiments, the waveguide construction of the arrayed waveguide grating is made characteristic by making the focal lengths of the first and second slab waveguides different from each other and forming the first and second slab waveguides to be non-parallel to each other, and the waveguide-formed area is divided, by the continuous separation plane intersecting both the optical passage of the first slab waveguide and the optical passage of the second slab waveguide, into the first waveguide-formed area including the optical input waveguides and optical output waveguides, and the second waveguide-formed area including arrayed waveguide. Still further, at least one of the first and second waveguide-formed areas is caused to slide and move along the above-described separation plane, whereby it is possible to shift the center wavelength of respective light transmissions of the arrayed waveguide grating.

Therefore, by shifting the center wavelength of respective light transmissions of the arrayed waveguide grating by a predetermined value, the center wavelength of respective light transmissions of the arrayed waveguide grating can be set to an adequate length.

And, since the above-described movement can be carried out in the direction to reduce the temperature dependency of the center wavelength of light transmission of the arrayed waveguide grating by adequately setting the direction and amount of the above-described slide movement, it is possible to eliminate the fluctuation (error in wavelength) due to the temperature dependency of the center wavelength of respective light transmissions.

In addition, according to the arrayed waveguide grating in which a slide movement member is provided in the mode that the slide movement mechanism stretches over the first waveguide-formed area and the second waveguide-formed area, it is possible to accurately determine the position in the axial direction vertical to the substrate surface by the slide movement member (that is, it is possible to prevent a positional error).

What is claimed is:

1. An arrayed waveguide grating in which a waveguide-formed area having a waveguide is formed on a substrate, wherein the waveguide comprising:

one or more optical input waveguides arranged side by side;

a first slab waveguide connected to the output end of said optical input waveguides;

an arrayed waveguide including a plurality of channel waveguides arranged side by side, each having a length different from each other by a set amount, that are connected to the output end of said first slab waveguide and propagate light introduced from the corresponding first slab waveguide;

a second slab waveguide connected to the output end of said arrayed waveguide;

a plurality of optical output waveguides arranged side by side connected to the output end of said second slab waveguide;

wherein the focal length of said first slab waveguide and that of the second slab waveguide are established to become different from each other;

a continuous separation plane is formed so as to intersect with both the light channel of the first slab waveguide and the light channel of the second slab waveguide;

said waveguide-formed area is divided into the first waveguide-formed area including said optical input waveguides and said optical output waveguides, and the second waveguide-formed area including said arrayed waveguide by said separation plane; and a slide movement mechanism is provided, which causes at least one of the second waveguide-formed area and the first waveguide-formed area to slide and move along said separation plane.

2. An arrayed waveguide grating in which a waveguide-formed area having a waveguide is formed on a substrate, wherein the waveguide comprising:

one or more optical input waveguides arranged side by side;

a first slab waveguide connected to the output end of said optical input waveguides;

an arrayed waveguide consisting of a plurality of channel waveguides arranged side by side, each having a length different by a set amount from each other, that are connected to the output end of said first slab waveguide and propagate light introduced from the corresponding first slab waveguide;

a second slab waveguide connected to the output end of said arrayed waveguide;

a plurality of optical output waveguides arranged side by side connected to the output end of said second slab waveguide;

wherein the first slab center axis that is the center axis of said first slab waveguide in its optical advancing direction and the second slab center axis that is the center axis of said second slab waveguide in its light advancing direction are not established to be parallel to each other;

a continuous separation plane is formed along a separation line passing through said first and second slab waveguides;

the relationship between an angle θ1 formed by said separation plane and said first slab center axis and an angle θ2 formed by said separation plane and said second slab center axis is θ1≠θ2, and is established to be (180°−θ1)#θ2; said waveguide-formed area is divided into the first waveguide-formed area including said optical input waveguides and said optical output waveguides, and the second waveguide-formed area including said arrayed waveguide by said separation plane; and a slide movement mechanism is provided, which causes at least one of the second waveguide-formed area and the first waveguide-formed area to slide and move along said separation plane.

3. The arrayed waveguide grating according to claim 1, wherein said slide movement mechanism includes a slide movement member in the mode of stretching over the first waveguide-formed area and the second waveguide-formed area.

4. The arrayed waveguide grating according to claim 2, wherein said slide movement mechanism includes a slide movement member in the mode of stretching over the first waveguide-formed area and the second waveguide-formed area.

5. The arrayed waveguide grating according to claim 1, wherein said slide movement mechanism shifts the center wavelength of light transmission of the arrayed waveguide grating by a predetermined value by causing at least one of the first waveguide-formed area and the second waveguide-formed area to slide and move along said separation plane.

6. The arrayed waveguide grating according to claim 2, wherein said slide movement mechanism shifts the center wavelength of light transmission of the arrayed waveguide grating by a predetermined value by causing at least one of the first waveguide-formed area and the second waveguide-formed area to slide and move along said separation plane.

7. The arrayed waveguide grating according to claim 3, wherein said slide movement mechanism shifts the center wavelength of light transmission of the arrayed waveguide grating by a predetermined value by causing at least one of the first waveguide-formed area and the second waveguide-formed area to slide and move along said separation plane.

8. The arrayed waveguide grating according to claim 4, wherein said slide movement mechanism shifts the center wavelength of light transmission of the arrayed waveguide grating by a predetermined value by causing at least one of the first waveguide-formed area and the second waveguide-formed area to slide and move along said separation plane.

9. The arrayed waveguide grating according to claim 1, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

10. The arrayed waveguide grating according to claim 2, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

11. The arrayed waveguide grating according to claim 3, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

12. The arrayed waveguide grating according to claim 4, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

13. The arrayed waveguide grating according to claim 5, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

14. The arrayed waveguide grating according to claim 6, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

15. The arrayed waveguide grating according to claim 7, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

16. The arrayed waveguide grating according to claim 8, wherein said slide movement mechanism causes at least one of the first waveguide-formed area and the second waveguide-formed area to slide and move along said separation plane in the direction to reduce the temperature dependency of the center wavelength of light transmission of the arrayed waveguide grating.

* * * * *